United States Patent
Kim

(10) Patent No.: US 8,418,820 B2
(45) Date of Patent: Apr. 16, 2013

(54) SHOCK ABSORBER AND ITS HYDRAULIC STOPPER

(75) Inventor: Eun Joong Kim, Jeollabuk-do (KR)

(73) Assignee: Mando Corporation, Gyeonggi-do (KR)

( * ) Notice: Subject to any disclaimer, the term of this patent is extended or adjusted under 35 U.S.C. 154(b) by 204 days.

(21) Appl. No.: 12/813,122

(22) Filed: Jun. 10, 2010

(65) Prior Publication Data

US 2011/0000753 A1    Jan. 6, 2011

(30) Foreign Application Priority Data

Jul. 2, 2009   (KR) .................. 10-2009-0060250

(51) Int. Cl.
*F16F 9/24*       (2006.01)
(52) U.S. Cl.
USPC .................. 188/284; 188/322.17; 188/322.22
(58) Field of Classification Search .................. 188/284, 188/297, 312, 322.17, 322.22
See application file for complete search history.

(56) References Cited

U.S. PATENT DOCUMENTS

| | | | | |
|---|---|---|---|---|
| 3,446,318 A | * | 5/1969 | Duckett | 188/317 |
| 4,345,748 A | * | 8/1982 | Wossner et al. | 267/226 |
| 4,585,099 A | * | 4/1986 | Taylor | 188/322.19 |
| 4,693,343 A | * | 9/1987 | Boyd | 188/322.17 |
| 7,032,727 B2 | * | 4/2006 | Vanspauwen | 188/284 |
| 2004/0060787 A1 | * | 4/2004 | Nakamura et al. | 188/316 |
| 2008/0088070 A1 | * | 4/2008 | Mori et al. | 267/140.12 |

* cited by examiner

*Primary Examiner* — Bradley King
*Assistant Examiner* — Mahbubur Rashid
(74) *Attorney, Agent, or Firm* — McDermott Will & Emery LLP

(57) ABSTRACT

Disclosed is a hydraulic stopper of a shock absorber. The shock absorber includes a cylinder and a piston rod having a piston valve. The stopper includes a closing member at one side of the piston rod to protect the piston valve, a free piston movable between the closing member and the rod guide to define a fluid passage with the piston rod, a sealing member between the free piston and the cylinder, and a rebound spring between the free piston and the rod guide to elastically support the free piston such that the free piston comes into close contact with the closing member to block the fluid passage when the piston rod moves excessively upward. The stopper may generate buffering effect using oil pressure without being restricted by the length of a rod guide, applied to a general shock absorber, and permit components thereof to be shared with the general shock absorber.

3 Claims, 4 Drawing Sheets

SHOCK ABSORBER AND ITS HYDRAULIC STOPPER

BACKGROUND

1. Technical Field

The present disclosure relates to a hydraulic stopper of a shock absorber, which restricts an excessive rise of a piston rod and, more particularly, to a hydraulic stopper of a shock absorber, which uses oil pressure to restrict rise of a piston rod in a rebound stroke.

2. Description of the Related Art

In general, a vehicle is provided with a suspension system for enhancing driving comfort by buffering impact or vibration transmitted from a road to an axle during driving. One component constituting the suspension system is a shock absorber.

FIG. 1 is a sectional view of a conventional shock absorber. Referring to FIG. 1, the shock-absorber 10 is disposed between an axle and a chassis, and includes a cylinder 12 and a piston rod 14 reciprocating in the cylinder 12. The cylinder 12 may be a single tube, or may be a dual tube that includes an inner tube 12a and an outer tube 12b as in an embodiment of the present disclosure.

Further, the cylinder 12 is provided at an upper portion thereof with a rod guide 16 that maintains a space between the inner tube 12a and the outer tube 12b and guides movement of the piston rod 14. Further, the cylinder 12 is filled with a buffering medium, such as gas, oil or the like, which is moved by a piston valve secured to one end of the piston rod 14 to generate a damping force.

In such a shock absorber 10, a stopper 20 is mounted on an outer circumference of the piston rod 14. The stopper 20 restricts an upward rise of the piston rod 14 upon excessive rebound, so that the piston valve can be prevented from damage and has improved roll characteristics when turning.

The stopper 20 may be attached to the piston rod 14 by welding or assembly. The stopper 20 includes a stopper bracket 22 secured to the piston rod 14, and a buffering part 24 provided to an upper portion of the stopper bracket 22. Here, the buffering part 24 is made of an elastic material and is deformed to absorb shock when coming into contact with a lower end of the rod guide 16.

With such a general configuration, there is a limitation in that the stopper 20 of the shock absorber 10 cannot sufficiently absorb shock when the piston rod 14 moves excessively upward. Accordingly, if an iterative and high load is repeatedly applied to the shock absorber, the buffering part 24 of the stopper 20 can be damaged, thereby causing product failure, noise and deterioration of driving comfort To overcome the limitations of the general stopper 20, a hydraulic stopper has been recently developed and used, which employs oil pressure to generate a buffering effect.

Since the buffering effect of the hydraulic stopper is controlled depending on the length of the rod guide, however, the rod guide and the shock-absorber must become longer in order to provide a higher buffering effect, thereby causing an increase in manufacturing cost while deteriorating yield. Further, a conventional hydraulic stopper employs a stop ring for controlling the buffering effect. In addition, not only does the hydraulic stopper necessitate a separate process for formation of orifices in the stop ring, but also has a problem in that the orifices formed in the stop ring are not uniformly distributed, deteriorating quality and reliability of the shock absorber.

BRIEF SUMMARY

The present disclosure is directed to solving the problems of the related art, and one embodiment provides a hydraulic stopper of a shock absorber, which has improved structure capable of generating a buffering effect using oil pressure without being restricted by the length of a rod guide, so that the stopper can be applied to a general shock absorber and permits components thereof to be shared with the general shock absorber.

In accordance with one aspect, there is provided a hydraulic stopper of a shock absorber including a cylinder and a piston rod provided at one end thereof with a piston valve and guided by a rod guide to reciprocate in the cylinder. The hydraulic stopper includes: a closing member disposed at one side of the piston rod and protecting the piston valve provided at the one end of the piston rod; a free piston movably disposed between the closing member and the rod guide and defining a fluid passage between the piston rod and an inner wall of the free piston; a sealing member disposed between the free piston and the cylinder and sealing a gap; and a rebound spring disposed between the free piston and the rod guide and elastically supporting the free piston to allow the free piston to come into close contact with the closing member and to block the fluid passage when the piston rod moves excessively upward.

The sealing member may include an O-ring, and the free piston is formed on an outer circumference thereof with an O-ring groove into which the O-ring is fitted. A spring sheet contacting the rebound spring may be disposed on an upper surface of the free piston. The closing member may include a ring shaped member disposed on an outer periphery of the piston rod. The closing member may include a washer disposed on the piston rod and above the piston valve to restrict deformation of a disk.

In accordance with another aspect, there is provided a shock absorber. The shock absorber includes: a cylinder having a rod guide; a piston rod provided at one end thereof with a piston valve and guided by the rod guide to reciprocate in the cylinder; a free piston movably disposed between the piston valve and the rode guide and defining a fluid passage; and a closing member fixed at an outer periphery of the piston rod to close and block the fluid passage when the free piston comes into contact with the closing member.

The shock absorber may further comprise an elastic member disposed between the free piston and the rod guide and elastically supporting the free piston. The elastic member may be a coil spring. The fluid passage may be defined between an inner wall of the free piston and the outer periphery of the rod guide. The free piston may comprise a sealing member for sealing gap between the inner surface of the cylinder and the outer surface of the free piston. The closing member may comprise a washer disposed on the piston rod and above the piston valve to restrict deformation of a disk.

DETAILED DESCRIPTION

Hereinafter, exemplary embodiments of the present disclosure will be described in detail with reference to the accompanying drawings.

Figure 1:
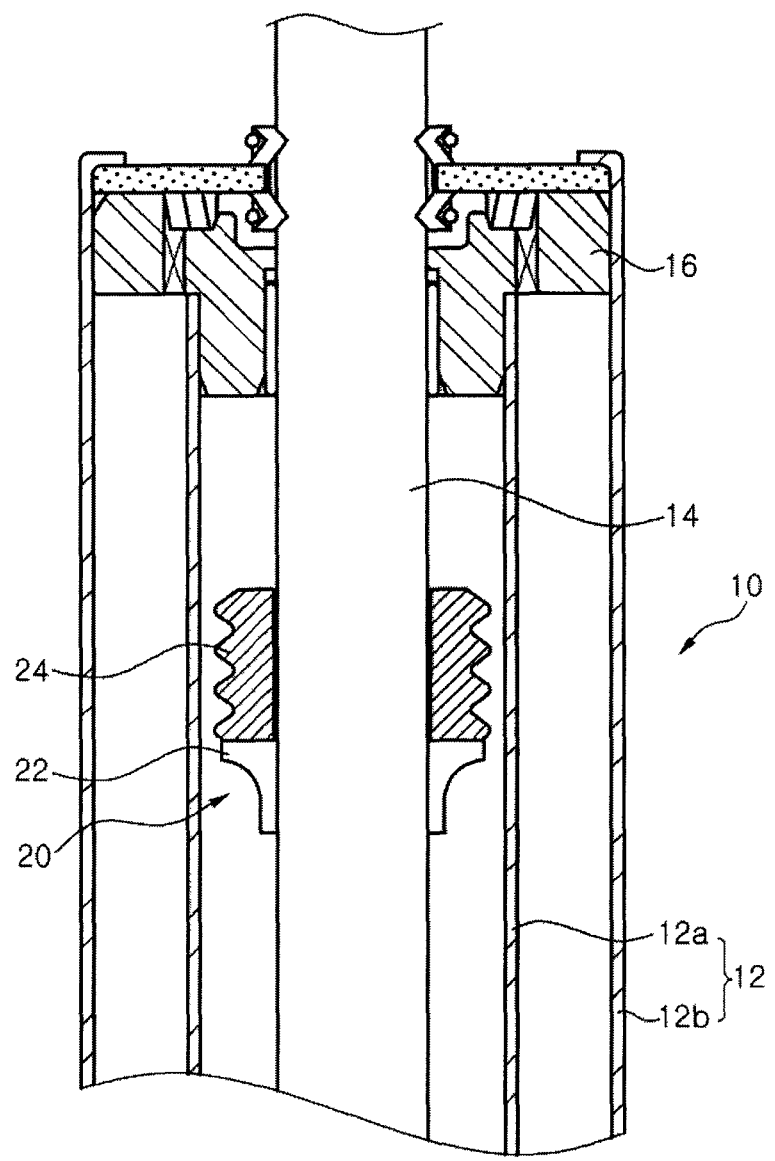
FIG. 1 is a sectional view of a conventional shock absorber.
Figure 2:
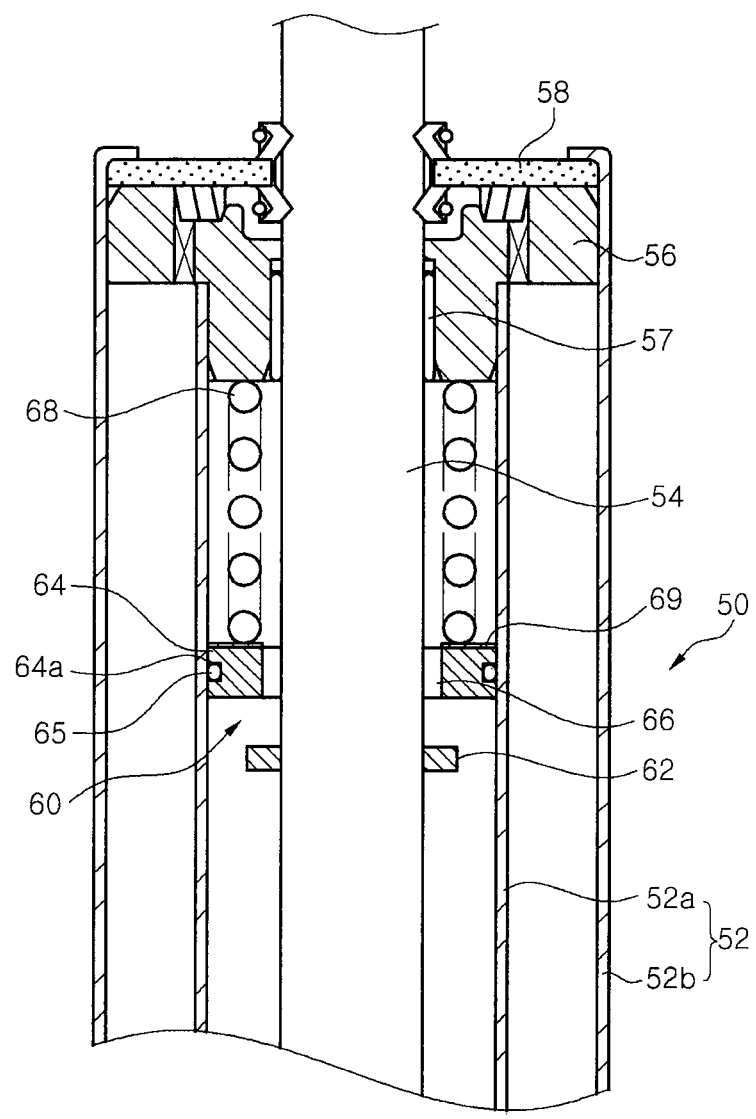
FIG. 2 is a sectional view of a hydraulic stopper of a shock absorber in accordance with one embodiment of the present disclosure.

FIG. 2 is a sectional view of a hydraulic stopper of a shock absorber in accordance with one embodiment of the present disclosure.

In FIG. 2, a hydraulic stopper 60 of a shock absorber 50 according to one embodiment is mounted on a piston rod 54 and generates a buffering effect using oil pressure when the piston rod 54 moves excessively upward, so that a piston valve can be prevented from being damaged and has improved roll characteristics when turning.

Here, a cylinder 52 includes an inner tube 52a and an outer tube 52b disposed outside the inner tube 52a. The inner tube 52a is filled with working fluid, i.e. oil, and the outer tube 52b is filled with oil that compensates for pressure inside the inner tube 52a.

The piston rod 54 is provided at one end thereof with a piston valve that divides the interior of the inner tube 52a of the cylinder 52 into a rebound chamber and a compression chamber. The piston valve controls flow of the fluid flowing into the rebound chamber or the compression chamber to generate the buffering effect while the piston rod 54 reciprocates in the cylinder.

Further, a rod guide 56 is disposed at upper portions of the inner tube 52a and the outer tube 52b. The piston rod 54 is disposed inside the inner tube 52a to reciprocate up and down by the rod guide 56. To this end, a predetermined space may be formed in a lower bore of the rod guide 56, and may be provided with a bushing 57 that contacts the piston rod 54 to reduce friction. Further, an oil seal 58 is disposed on an upper side of the cylinder 52 to prevent oil leakage from the cylinder 52 and to block foreign matter from entering the cylinder 52. For this purpose, the oil seal 58 is secured to the shock absorber 50 by caulking an upper end of the outer tube 52b of the cylinder 52.

Further, the piston rod 54 of the shock absorber 50 is provided with a closing member so as to prevent the piston valve from contacting the rod guide 56 and being damaged when the shock absorber 50 is compressed.

The closing member may be realized by a washer disposed on the piston valve for restricting deformation of a disk. In this embodiment, the closing member is realized by a rigid ring or a ring shaped member 62 disposed on one side of the piston rod 54 as shown in FIG. 2. The ring shaped member 62 may be fixed to an outer periphery of the piston rod.

Further, a free piston 64 is disposed between the rod guide 56 and the ring shaped member 62. The free piston 64 is formed at the center thereof with a hole, and is disposed to move up and down while being inserted into the piston rod 54. This hole of the free piston 64 defines a gap between the free piston 64 the piston rod 54 to form a fluid passage 66, through which fluid can flow between upper and lower portions of the free piston 64.

An O-ring 65 is provided on an outer circumference of the free piston 64 and serves as a sealing member for sealing a gap with the inner tube 52a of the cylinder 52. For this purpose, an O-ring groove 64a, into which the O-ring 65 is fitted, is formed on the outer circumference of the free piston 64.

The free piston 64 may be manufactured by sintering and thus have a uniform shape, thereby maintaining uniform distribution and exhibiting stable performance.

A rebound spring may be disposed between the free piston 64 and the rod guide 56 to elastically support the free piston 64. When the piston rod 54 moves excessively upward, the rebound spring elastically contacts the free piston 64 and restricts the rise of the free piston 64. For example, the rebound spring may be realized by a coil spring 68. Further, the coil spring 68 may be fastened to a lower portion of the rod guide 56.

When the rise of the free piston 64 is restricted, the free piston 64 comes into close contact with the ring shaped member 62, and thus, a fluid passage 66 is blocked, thereby restricting the flow of the fluid and serving as a buffering chamber that generates a buffering effect.

Further, a spring sheet 69 may be disposed between the coil spring 68 and the free piston 64 to reduce noise due to the contact. For example, the spring sheet 69 may be placed on an upper surface of the free piston 64.

Figure 3:
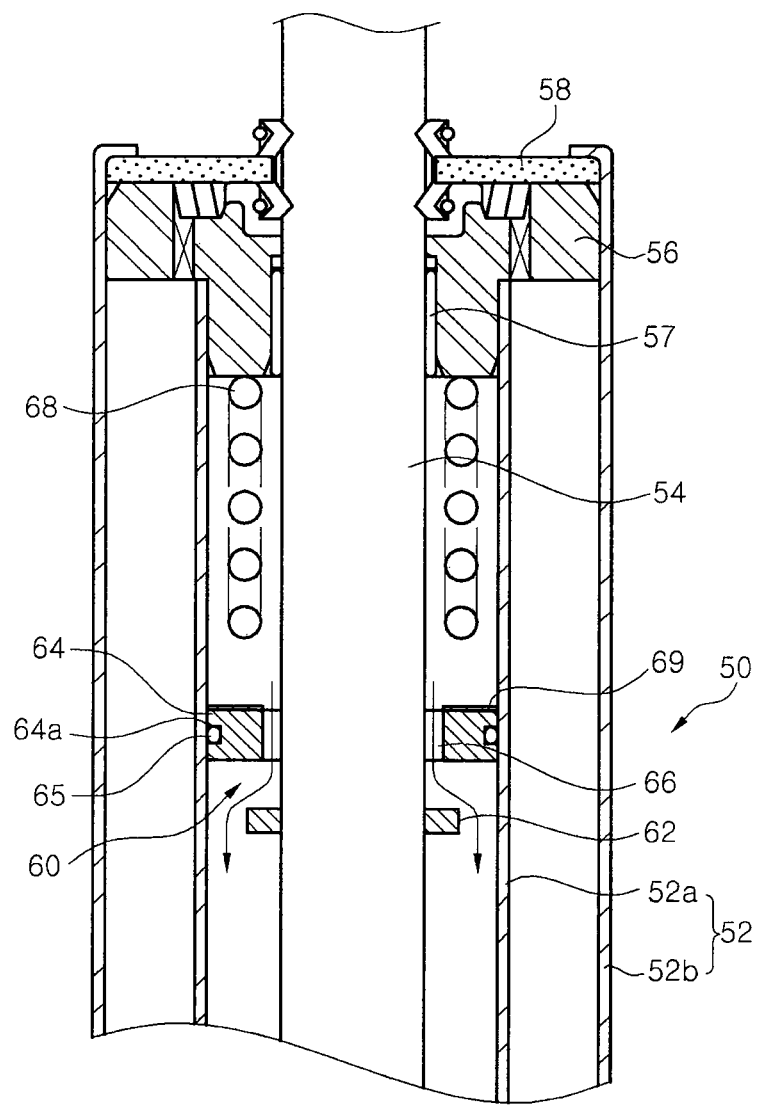
FIG. 3 is a sectional view of the hydraulic stopper of the shock absorber, in a state of generating no buffering effect, in accordance with the embodiment of the present disclosure.
Figure 4:
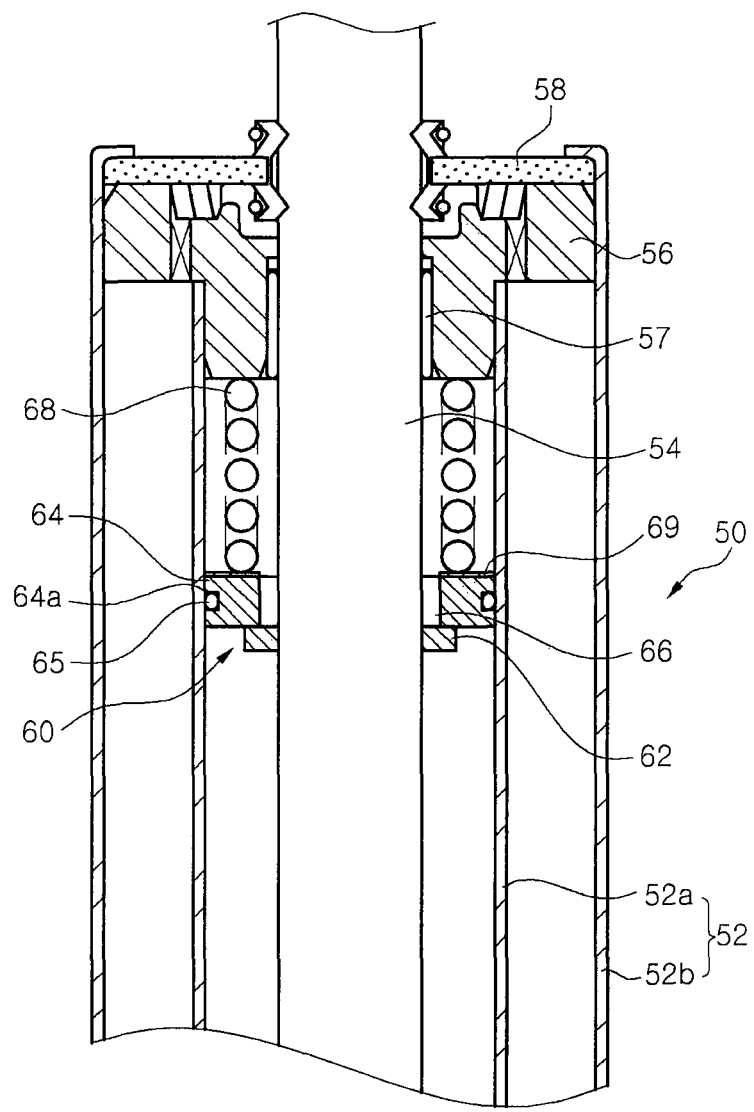
FIG. 4 is a sectional view of the hydraulic stopper of the shock absorber, in a state of generating buffering effect, in accordance with the embodiment of the present disclosure.

FIG. 3 is a sectional view of the hydraulic stopper of the shock absorber, in a state of generating no buffering effect, in accordance with the embodiment of the present disclosure, and FIG. 4 is a sectional view of the hydraulic stopper of the shock absorber, in a state of generating a buffering effect, in accordance with the embodiment.

When the piston rod 54 of the shock-absorber 50 is slightly displaced, for instance, if the piston rod 54 has a small rebound stroke as shown in FIG. 3, the fluid passage 66 between the free piston 64 and the ring shaped member 62 is not blocked and the fluid can flow even when the piston rod 54 moves upward, thereby generating no buffering effect. Here, even when the piston rod 54 moves so quickly that the free piston 64 and the ring shaped member 62 contact each other, the fluid causes the free piston 64 to move up, and thus, there is no restriction to the flow of the fluid.

As such, in the case where the rebound stroke is small, the working fluid above the free piston 64 moves down through the fluid passage and an outside of the ring shaped member 62.

Accordingly, the hydraulic stopper 60 of the shock absorber 50 generates no buffering effect. Further, in a compression stroke, the fluid can freely flow since the free piston 64 and the ring shaped member 62 are not in contact with each other.

On the other hand, when the piston rod 54 of the shock-absorber 50 is heavily displaced, for instance, if the piston rod 54 has a large rebound stroke as shown in FIG. 4, the piston rod 54 moves upward, and thus, the ring shaped member 62 and the free piston 64 are brought into contact with each other. Here, the free piston 64 moves upward while the displacement of the piston rod 54 increases, and then comes into contact with the ring shaped member 62 as the free piston 64 is elastically supported by the coil spring 68 to restrict the rise of the free piston 64.

Thus, when the free piston 64 and the ring shaped member 62 are in contact with each other, the fluid passage inside the free piston 64 is blocked, so that the working fluid above the free piston 64 cannot flow.

Consequently, when the piston rod 54 moves excessively upward, the hydraulic stopper 60 according to the embodiment blocks the fluid passage between the free piston 64 and the ring shaped member 62 to prevent leakage of the working fluid, so that the working fluid remaining above the free piston 64 generates a buffering effect, thereby restricting the rise of the piston rod 54.

As apparent from the above description, the hydraulic stopper of the shock absorber according to the embodiment of the disclosure generates a higher buffering effect than a stopper having a general shock-absorbing structure. Further, since oil pressure is controlled to generate the buffering effect by the free piston, coil spring and closing member, the hydraulic stopper of the shock absorber has advantages in that it has a simple structure, is easily manufactured and is applicable to a general shock absorber. Further, the hydraulic stopper according to the embodiment allows working displacement of the piston rod to be controlled by adjusting the length of the coil spring, and can be easily manufactured since the free piston is manufactured by sintering. Furthermore, the hydraulic stopper according to the embodiment has enhanced reliability due to uniform product quality. Moreover, even when the shock absorber has an increased stroke or the cylinder is changed in size and the like, buffering effect can be easily controlled and tuned by changing the coil spring. Further, the spring sheet provided to the free piston can reduce noise due to contact.

The various embodiments described above can be combined to provide further embodiments. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A hydraulic stopper of a shock absorber including a cylinder and a piston rod provided at one end thereof with a piston valve and guided by a rod guide to reciprocate in the cylinder, the hydraulic stopper comprising:
   a closing member disposed at one side of the piston rod;
   a free piston movably disposed between the closing member and the rod guide, the free piston being formed at the center thereof with a hole and being disposed to move up and down while being inserted into the piston rod, the hole defining an inner gap between an inner wall of the free piston and a periphery of the piston rod;
   a sealing member disposed between the free piston and the cylinder and sealing an outer gap; and
   a rebound spring disposed between the free piston and the rod guide and elastically supporting the free piston to allow the free piston to come into contact with the closing member,
   wherein the closing member blocks an end of the inner gap and restricts a flow of fluid through the inner gap, when the piston rod moves excessively upward and the free piston comes into contact with the closing member,
   wherein one end of the rebound spring is fixed to the rod guide and another end of the rebound spring is not fixed to, and selectively contacts, the free piston,
   wherein the closing member is not deformed by any pressure of fluid flowing through the inner gap,
   wherein the sealing member comprises an O-ring, and the free piston is formed on an outer circumference thereof with an O-ring groove into which the O-ring is fitted, and
   wherein the closing member comprises a washer disposed on the piston rod and above the piston valve to restrict deformation of a disk.

2. A shock absorber comprising:
   a cylinder having a rod guide;
   a piston rod provided at one end thereof with a piston valve and guided by the rod guide to reciprocate in the cylinder;
   a free piston movably disposed between a closing member and the rod guide, the free piston being formed at the center thereof with a hole and being disposed to move up and down while being inserted into the piston rod, the hole defining an inner gap between an inner wall of the free piston and a periphery of the piston rod;
   the closing member being fixed at an outer periphery of the piston rod to block an end of the inner gap and to restrict a flow of fluid through the inner gap, when the piston rod moves excessively upward and the free piston comes into contact with the closing member; and
   an elastic member disposed between the free piston and the rod guide so as to elastically support the free piston,
   wherein the closing member is not deformed by any pressure of fluid flowing through the inner gap,
   wherein one end of the elastic member is fixed to the rod guide and another end of the elastic member is not fixed to, and selectively contacts, the free piston,
   wherein a fluid passage is defined between the inner wall of the free piston and the periphery of the piston rod,
   wherein the free piston comprises a sealing member for sealing an outer gap between an inner surface of the cylinder and an outer surface of the free piston, and
   wherein the closing member comprises a washer disposed on the piston rod and above the piston valve to restrict deformation of a disk.

3. The shock absorber according to claim 2, wherein the elastic member is a coil spring.

* * * * *